June 27, 1950  W. A. WIKARSKI  2,512,818
FISHHOOK EXTRACTOR
Filed Oct. 25, 1947

INVENTOR.
Walter A. Wikarski,
BY
atty

Patented June 27, 1950

2,512,818

UNITED STATES PATENT OFFICE 2,512,818

FISHHOOK EXTRACTOR

Walter A. Wikarski, Chicago, Ill.

Application October 25, 1947, Serial No. 782,095

5 Claims. (Cl. 43—53.5)

The present invention relates to fish hook extractors, and has for its main object the provision of a device for engaging a fish hook embedded in the tissues of a fish's mouth for extracting the same.

Another object of the present invention is the provision of a fish hook extractor capable of firmly engaging a fish hook in such a manner as to be capable of manipulating the hook laterally and longitudinally for extracting the same from a fish's mouth.

A still further object of the present invention is the provision of a pair of slidable members provided at their ends with complementary recesses permitting the entry of a fish hook when said slidable members have been shifted into one direction, and which members may positively engage the hook and firmly grasp the same preparatory to its manipulation for dislodging the same when said members have been shifted into the opposite direction.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views.

Figure 1:
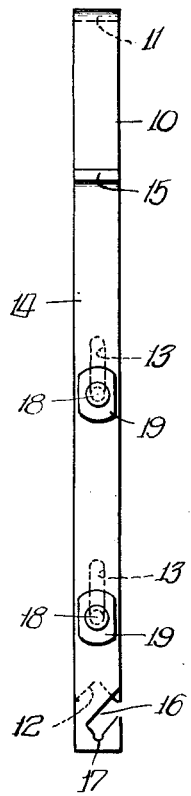
Fig. 1 is a side elevational view of the present device while in an inoperative condition.

Referring in detail to the present drawing there is shown therein an oblong strip 10, having handle 11 integrally formed therewith and projecting at a right angle therefrom. The opposite end of said strip 10 is provided with notch 12, the apex of which coincides with the transverse center of said strip 10. A pair of slots 13 is made in the body of strip 10 in a longitudinal, spaced relation.

Cooperating with said strip 10 is strip 14, which is shorter than strip 10. Said strip 14 at one of its ends is provided with an integrally formed handle 15, bent at a right angle with relation to the body portion of said strip 14 and bent into the direction opposite from that of handle 11.

Made at the opposite end of said strip 14 is recess 16, which is in an oblique relation with the body of said strip 14. Said recess 16 opens through one edge of strip 14, but terminates short of the opposite edge thereof. Said recess 16 is of a substantially trapezoidal or rectangular formation, and its one corner 17 is disposed in an alignment with the apex of notch 12, longitudinally of strips 10 and 14 and coincidentally with the transverse centers thereof. The corner 17 is formed as a semi-circular recess and corresponds substantially in size to the semi-cross-section of the bill of a fish hook.

Figure 2:
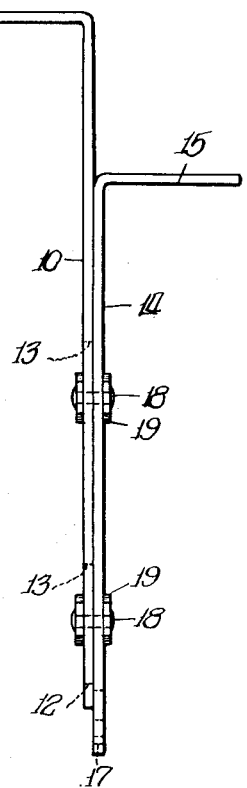
Fig. 2 is an edge elevational view of the device while in an inoperative condition.
Figure 3:
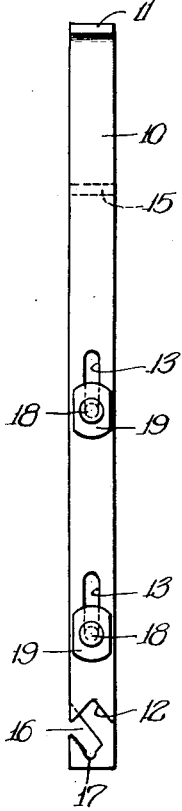
Fig. 3 is a side elevational view of the device of the side opposite of that of Fig. 1.
Figure 4:
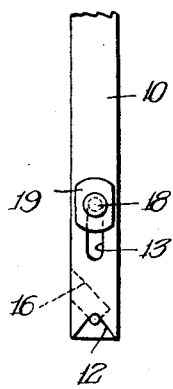
Fig. 4 is a fragmentary, side elevational view of the device while in an operative condition.
Figure 5:
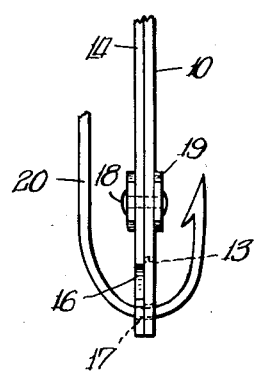
Fig. 5 is a fragmentary, edge elevational view of the device, showing its operative engagement with a fish hook.

Rigidly engaged to said strip 14 are pins 18, which are extended through slots 13 in strip 10. Ends of said pins 18 are riveted. Washers 19 are interposed between the rivet heads of said pins 18 and the sides of said strips 10 and 14. By virtue of this arrangement strips 10 and 14 may be shifted with relation to each other in either direction. The extent of shifting is limited however by pins 18 coming in contact with one or other ends of slots 13. Thus, when strip 14 has been shifted to its inoperative position with respect to strip 10, as seen in Figs. 1, 2 and 3, recess 16 is open, with its side end unobstructed by the body portion of strip 10, and in condition to receive therewithin a fish hook. In that inoperative relative positions of strips 10 and 14, pins 18 are within the lower ends of slots 13, and thereby further shifting of the operative ends of said strips 10 and 14, away from each other, is prevented. When said strips 10 and 14 are shifted into the opposite direction, the operative ends of said strips 10 and 14 come into an aligned mutual relation, as seen in Fig. 4, with pins 18 reposing within the upper ends of said slots 13.

The shifting movement of said strips 10 and 14 is effected by manual operation of handles 11 and 15. To remove or dislodge hook 20 from its engagement by its barbed end with the tissues in a fish's mouth, the device should be preferably held in an upright position, with handles 11 and 15 at the upper end thereof as shown in Fig. 2. The connection between strips 10 and 14 through the medium of pins 18 is rather loose, so that when the device is held in that position strip 14 will shift downwardly by gravity. This operation will bring strips 10 and 14 into their inoperative position, illustrated in Figs. 1 and 3, with the end of recess 16 open. While holding fish in one hand, the operator inserts the extractor by holding handle 11 by his other hand. The operator then manipulates the extractor in order to pass the bight of fish hook 20 into recess 16 through its open end along one edge of strip 14. When this is done, the operator, while exerting pressure by the palm of his hand at the outer face of handle 11, grasps handle 15 at its lower face by two or more of his fingers, and shifts strips 10 and 14 into the opposite direction for closing recess 16 by the body portion of strip 10. This operation brings the apex of notch 12 toward corner 17, with the bight of fish hook 20 clamped firmly by the body portions of strips 10 and 14, adjacent the apex of notch 12 and corner 17 of recess 16, respectively. When the fish hook is thus engaged and firmly clamped by strips 10 and 14, the extractor may then be manipulated, while maintaining the manual hold on handles 11 and 15, both longitudinally and laterally with relation to hook 20 for withdrawing the same from its engagement with the tissues of a fish's mouth. When this is done the extractor is then removed from a fish's mouth together with a fish hook. Mere push at handle 15 away from handle 11 will shift strip 14 into its inoperative position with relation to strip 10 for opening recess 16 as hereinabove described. The fish hook is then removed by passing the same through the open end of recess 16.

While there is described herein preferred embodiments of the present invention, it is nevertheless to be understood that minor changes may be made therein without departing from the spirit and scope of the invention as claimed.

What I claim as new is:

1. A fish hook extractor comprising a pair of elongated members arranged in a mutual slidable relation, one of said members being provided at one of its ends with an open, substantially V-shaped notch, the apex of said notch being substantially at a point coincidental with the transverse center of said members, the other of said members being provided adjacent one of its ends with a recess of substantially trapezoidal formation extending downwardly toward the adjacent end of said member and inwardly from the longitudinal edge thereof, the inner lower corner of said recess being semi-circular and corresponding in size substantially to the semi-cross-section of the bill of a fish hook, the center of the semi-circular portion of the recess being disposed substantially at a point coincidental with the transverse center of said members, and means for longitudinal shifting of one of said members with relation to the other, whereby when one of said members has been shifted to one direction the end of said recess opening along one edge of said second named member remains unobstructed by said first named member for reception of a fish hook into said recess, and when one of said members has been shifted into the opposite direction the apex of said notch shifting toward the semi-circular corner of said recess will exert a clamping action upon the bill of a fish hook reposing therewithin.

2. A fish hook extractor comprising two members each having substantial length in respect to its width and one member being longer than the other, each member having at the same end as the other member a portion extending laterally from another portion of this respective member and in opposite directions and in substantially the same plane as the laterally extending portion of the other member and being spaced from each other lengthwise of said members, each member having means providing for longitudinal sliding relation between the members, said means including slots, the length of the slots being less than the distance between the extending portions, the shorter of said members having at its lower end a substantially trapezoidal shaped slot extending downwardly toward the adjacent end of said member and inwardly from one longitudinal edge thereof and being open thereat, said slot being provided at its lowest corner with a substantially semi-circular recess corresponding in size substantially to the semi-cross section of the bill of a fish hook, the center of the semi-circular recess being coincident with a plane including the longitudinal axis of both members and the slots, the other member having at its lower edge a V-shaped groove, the sides of the V extending to the outer edge of said member in the fully open position of the trapezoidal shaped slot and overlapping a portion of the open end of said slot whereby when said members are manipulated to move the trapezoidal shaped slot toward the V-shaped groove the sides of the trapezoidal slot and the sides of the V-shaped groove will cam the bill of said hook into the semi-circular recess and simultaneously extend one end of the V-shaped groove completely across the open end of the trapezoidal slot and move the apex of the V-shaped groove in clamping contact with the bill in the semi-circular recess.

3. A fish hook extractor comprising two members of unequal length each having a substantial length in respect to its width, each member having means providing for longitudinal sliding relation between the members, said means including slots, the length of the slots being less than the difference in length of the two members, the shorter of said members having at its lower end a substantially trapezoidal shaped slot extending downwardly toward the adjacent end of said member and inwardly from one longitudinal edge thereof and being open thereat, said slot being provided at its lowest corner with a substantially semi-circular recess corresponding in size substantially to the semi-cross section of the bill of a fish hook, the center of the semi-circular recess being coincident with a plane including the longitudinal axis of both members and the slots, the other member having at its lower edge a V-shaped groove, the sides of the V extending to the outer edge of said member in the fully open position of the trapezoidal shaped slot and overlapping a portion of the open end of said slot whereby when said members are manipulated to move the trapezoidal shaped slot toward the V-shaped groove the sides of the trapezoidal slot and the sides of the V-shaped groove will cam the bill of said hook into the semi-circular recess and simultaneously extend one end of the V-shaped groove completely across the open end of the trapezoidal slot and move the apex of the V-shaped groove in clamping contact with the bill in the semi-circular recess.

4. A fish hook extractor comprising two members each having substantial length in respect to its width, means providing for relative longitudinal sliding relation between the members, each member having a finger portion at the same end as the other member in position to be grasped to slide one member relative to the other member, one of said members having at its lower end a substantially trapezoidal shaped slot extending downwardly toward the adjacent end of said member and inwardly from one longitudinal edge thereof, the lower corner of the slot being substantially in a plane extending through the longitudinal axis of both members, the other member having at its lower edge a V-shaped groove, the sides of the V extending to the outer edge of said member in the fully open position of the trapezoidal shaped slot, whereby when said members are manipulated to move the trapezoidal shaped slot toward the V-shaped groove the sides of the trapezoidal slot and the sides of the V-shaped groove will cam the bill of said hook into the lower corner of the slot and simultaneously extend one end of the V-shaped groove completely across the open end of the trapezoidal slot and move the apex of the V-shaped groove in clamping contact with the fish hook.

5. A fish hook extractor comprising two members each having substantial length in respect to its width, each member having means providing for longitudinal sliding relation between the members, one of said members having at its lower end a substantially trapezoidal shaped slot extending downwardly toward the adjacent end of said member and inwardly from one longitudinal edge thereof, the lower corner of the slot being coincident with a plane including the longitudinal axis of both members. the other member having at its lower edge a V-shaped groove, the sides of the V extending to the outer edge of said member in the fully open position of the trapezoidal shaped slot, whereby when said members are manipulated to move the trapezoidal shaped slot toward the V-shaped groove the sides of the trapezoidal slot and the sides of the V-shaped groove will cam the bill of said hook into the lower corner of the slot and simultaneously extend one end of the V-shaped groove completely across the open end of the trapezoidal slot and move the apex of the V-shaped groove in clamping contact with the fish hook.

WALTER A. WIKARSKI.

REFERENCES CITED

The following references are of record in the file of this patent:

UNITED STATES PATENTS

| Number | Name | Date |
|---|---|---|
| 1,539,221 | Tennant | May 26, 1925 |
| 1,777,695 | Jeffery | Oct. 7, 1930 |

FOREIGN PATENTS

| Number | Country | Date |
|---|---|---|
| 235,367 | Great Britain | June 18, 1925 |